(12) United States Patent
Kusumoto

(10) Patent No.: US 10,740,200 B2
(45) Date of Patent: Aug. 11, 2020

(54) REDUNDANCY CONFIGURATION SYSTEM, SWITCHING SYSTEM, AND INFORMATION PROCESSING SYSTEM

(71) Applicant: Akira Kusumoto, Kanagawa (JP)

(72) Inventor: Akira Kusumoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 187 days.

(21) Appl. No.: 15/884,540

(22) Filed: Jan. 31, 2018

(65) Prior Publication Data

US 2018/0239678 A1 Aug. 23, 2018

(30) Foreign Application Priority Data

Feb. 17, 2017 (JP) .................................. 2017-027780

(51) Int. Cl.
| | | |
|---|---|---|
| *G06F 11/20* | (2006.01) | |
| *H04L 12/24* | (2006.01) | |
| *H04L 29/14* | (2006.01) | |
| *G06F 11/30* | (2006.01) | |
| *G06F 11/34* | (2006.01) | |
| *H04L 29/08* | (2006.01) | |

(Continued)

(52) U.S. Cl.
CPC ...... *G06F 11/2023* (2013.01); *H04L 41/0668* (2013.01); *H04L 41/0859* (2013.01); *H04L 69/40* (2013.01); *G06F 11/2038* (2013.01); *G06F 11/3006* (2013.01); *G06F 11/3495* (2013.01); *G06F 2201/805* (2013.01); *H04L 43/0817* (2013.01); *H04L 61/1511* (2013.01); *H04L 61/2007* (2013.01); *H04L 67/10* (2013.01)

(58) Field of Classification Search
CPC ............. G06F 11/2023; G06F 11/1484; G06F 11/2005; G06F 11/202
See application file for complete search history.

(56) References Cited

U.S. PATENT DOCUMENTS

| | | |
|---|---|---|
| 5,473,599 A | 12/1995 | Li et al. |
| 2009/0003320 A1* | 1/2009 | Luo ........................ H04L 45/00 370/352 |

(Continued)

FOREIGN PATENT DOCUMENTS

JP 2005-094446 4/2005

*Primary Examiner* — Jigar P Patel
(74) *Attorney, Agent, or Firm* — Oblon, McClelland, Maier & Neustadt, L.L.P.

(57) ABSTRACT

A redundancy configuration system performs switching between a first information processing system and a second information processing system for continuously providing information processing. The redundancy configuration system includes circuitry. The circuitry monitors information processing performed by the first information processing system. Based on a monitoring result obtained by the monitoring, the circuitry requests a management system, which has assigned address information to the first information processing system, to reassign the address information to the second information processing system. The circuitry controls the second information processing system to start information processing in response to receiving a notification from the management system that the address information has been reassigned to the second information processing system.

18 Claims, 9 Drawing Sheets

(51) Int. Cl.
*H04L 29/12* (2006.01)
*H04L 12/26* (2006.01)

(56) References Cited

U.S. PATENT DOCUMENTS

| | | | | |
|---|---|---|---|---|
| 2010/0254205 A1* | 10/2010 | Yamauchi | ............... | G11C 17/16 365/200 |
| 2013/0117223 A1* | 5/2013 | Niki | ...................... | G06F 16/185 707/610 |
| 2015/0205650 A1* | 7/2015 | Shimada | ............... | G06F 11/004 714/703 |
| 2016/0043549 A1* | 2/2016 | Beauregard | ............ | G05B 13/04 700/286 |

* cited by examiner

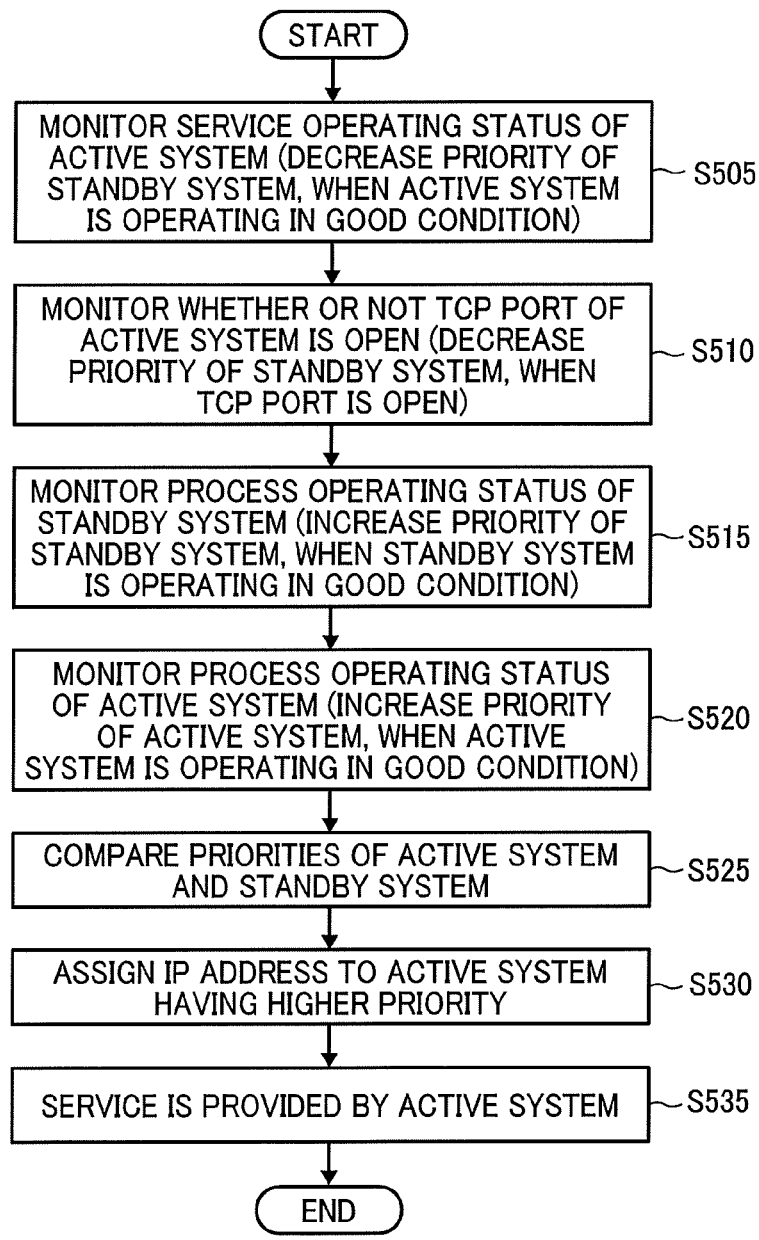

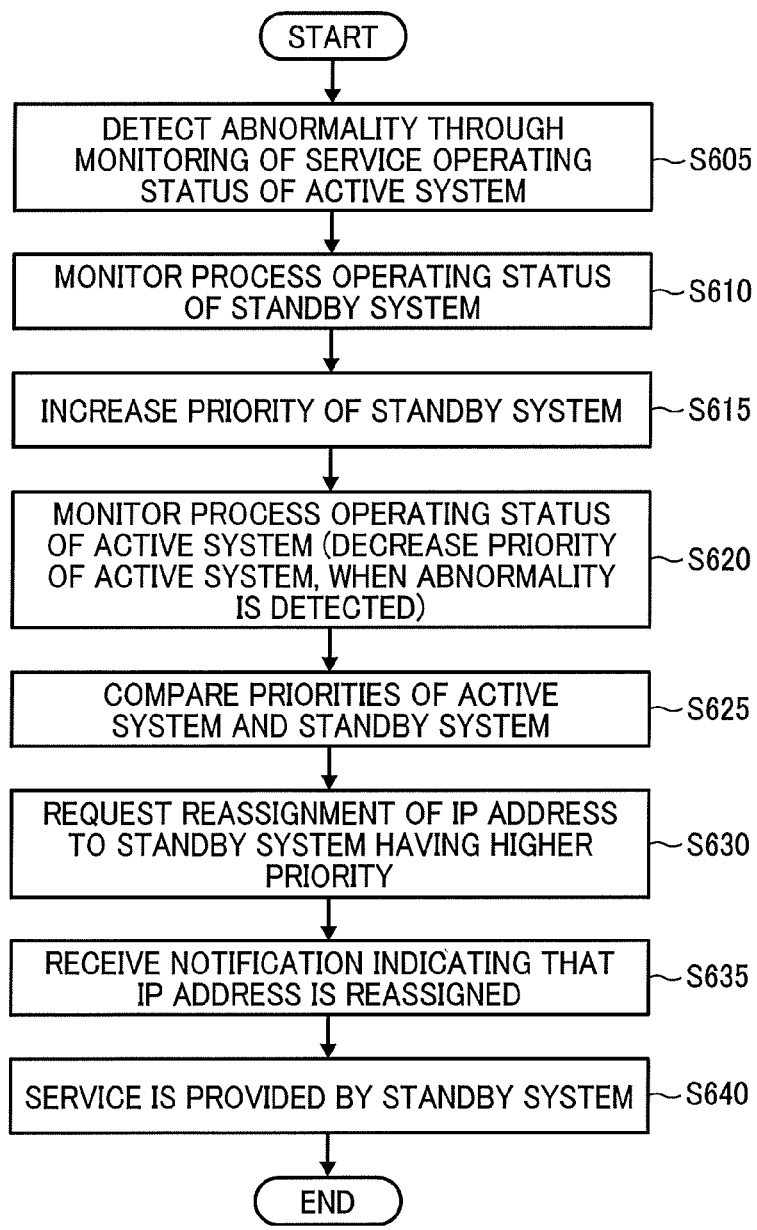

| | ACTIVE SYSTEM | STANDBY SYSTEM |
|---|---|---|
| NORMAL | 100 | 90 |
| GLOBAL IP ADDRESS SERVICE IS INOPERATIVE | 100 | 150 |
| PORT OF ACTIVE SYSTEM IS INOPERATIVE | 100 | 110 |
| PORT OF ACTIVE SYSTEM IS INOPERATIVE | 80 | 90 |
| SERVICE (PROCESS) OF ACTIVE SYSTEM IS RESTORED | 90 | 100 |
| PROCESS OF STANDBY SYSTEM IS INOPERATIVE | 100 | 70 |
| MONITORING PROCESS OF ACTIVE SYSTEM IS STOPPED | - | 100 |
| MONITORING PROCESS OF STANDBY SYSTEM IS STOPPED | 100 | - |

REDUNDANCY CONFIGURATION SYSTEM, SWITCHING SYSTEM, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2017-027780, filed on Feb. 17, 2017, in the Japan Patent Office, the entire disclosure of which is hereby incorporated by reference herein.

BACKGROUND

Technical Field

The present disclosure relates to a redundancy configuration system, a switching method, and an information processing system.

Description of the Related Art

Some of systems that provide a service such as a web server have a redundant configuration including an active system and a standby system. In such systems, even when the active system fails, the standby system takes over providing the service.

Such redundancy configuration system is implemented by using, for example, Virtual Router Redundancy Protocol (VRRP) or Hot Standby Router Protocol (HSRP). According to VRRP or HSRP, a virtual IP address is created in the same network segment, in addition to the unique IP addresses of the active system and the standby system. The created virtual IP address is allocated to the standby system, when the active system fails. Therefore, a client that requests a service only has to recognize the virtual IP address to receive the service continuously.

In addition, such redundancy configuration system is implemented by using, for example, the Domain Name System (DNS). In the DNS, a client inputs a domain name that is easy for a user to remember. A DNS server performs name resolution for converting the domain name to an IP address by a DNS contents server function, and responds the result to the client. The client is able to access the system that provides a service using the IP address obtained by the name resolution. In such DNS technology, the DNS content server function is able to assign plural IP addresses to one domain name, and to define which IP address is to be used in priority.

On the other hand, in a computing environment such as a public cloud that is used by an arbitrary number of clients, the client is not able to use functions and settings that are not provided as cloud services.

In the technique using VRRP as described above, multicast communication is used to enable access to both the active system and the standby system. However, this technique is not applicable to the public cloud, because the public cloud does not support multicast communication.

Furthermore, the above-described technique using the DNS is implemented on the premise that a network administrator configures the IP address settings in a local network. The network administrator is not able to perform operation or configure settings in the public cloud.

SUMMARY

A redundancy configuration system performs switching between a first information processing system and a second information processing system for continuously providing information processing. The redundancy configuration system includes circuitry. The circuitry monitors information processing performed by the first information processing system. Based on a monitoring result obtained by the monitoring, the circuitry requests a management system, which has assigned address information to the first information processing system, to reassign the address information to the second information processing system. The circuitry controls the second information processing system to start information processing in response to receiving a notification from the management system that the address information has been reassigned to the second information processing system.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a flowchart illustrating an example of steps in an operation performed by the active system and the standby system in a normal operation according to an embodiment of the present disclosure;

FIG. 6 is a flowchart illustrating an example of steps in an operation for switching from the active system to the standby system when an abnormality occurs in the active system, according to an embodiment of the present disclosure;

Figure 1:
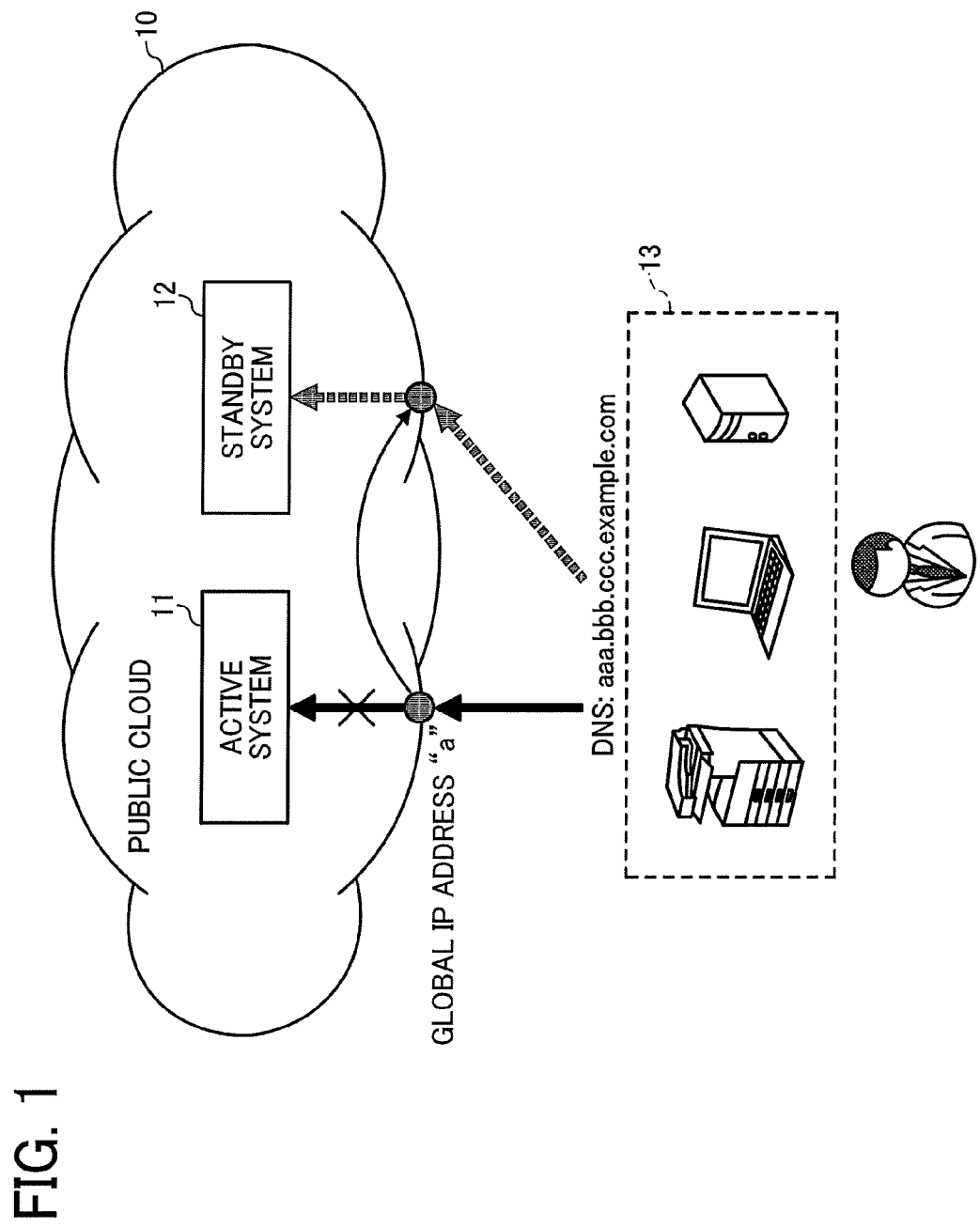
FIG. 1 is a schematic diagram illustrating processes performed by a redundancy configuration system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

FIG. 1 is a schematic diagram illustrating processes performed by a redundancy configuration system according to an embodiment of the present disclosure. The redundancy configuration system is built on a public cloud 10 used by an arbitrary number of communication terminals (hereinafter referred to as "clients"). The redundancy configuration system includes an active information processing system (hereinafter referred to as an "active system") 11, and a standby information processing system (hereinafter referred to as a "standby system") 12.

In normal operation, the active system 11 performs information processing in response to a request from a client 13 to provide the client with a service. Any suitable service may be provided, such as a content distribution service like an online music store or video on demand, or an information search service.

When the active system 11 becomes not able to provide a service due to the occurrence of abnormality such as a breakdown for some reason, the standby system 12 starts information processing to provide the service on behalf of the active system 11.

The client 13 receives the service provided by the active system 11 or the standby system 12. Examples of the client 13 include a personal computer (PC) or a multifunctional peripheral (MFP). The client 13 accesses the active system 11 that provides the service using address information such as a global IP address. The global IP address is an IP address used by the client 13 for accessing the active system 11 via the Internet. A management system on the public cloud 10 assigns the global IP address to the active system 11.

While the redundancy configuration system is in normal operation, the active system 11 receives a request for the service from the client 13. In response to the request, the active system 11 provides the client 13 with the service. When the active system 11 becomes not able to continue to provide the service due to the occurrence of abnormality, the active system 11 requests the management system to reassign the global IP address that is currently assigned to the active system 11 to the standby system 12. Thus, the global IP address is reassigned to the standby system 12. This enables the standby system 12 to continue to provide the client 13 with the service on behalf of the active system 11.

The active system 11 and the standby system 12 communicate with each other in a one-to-one manner by unicast communication to mutually monitor the operating status of the counterpart system and the communication status with the client 13. This communication is implemented by using address information such as a private IP address instead of a global IP address. In addition, the active system 11 and the standby system 12 are able to monitor the operation status of the own system. Based on a result obtained by such monitoring, the redundancy configuration system requests the reassignment of the global IP address from the active system 11 to the standby system 12 to implement the switching of systems.

The mutual monitoring is implemented by using the VRRP mechanism as described above. In this case, mutual monitoring by the unicast IP layer 3 is used instead of network monitoring by the multicast layer 3, which is common in VRRP. This enables to implement mutual monitoring between the active system 11 and the standby system 12, even in a computing environment where a logical network cannot physically be constructed.

In addition, by requesting the reassignment of the global IP address and having the global IP address reassigned, switching from the active system 11 to the standby system 12 is implemented without setting by the administrator.

The client 13 accesses the redundancy configuration system using a domain name as identification information for identifying the redundancy configuration system in order to receive the service from the redundancy configuration system. By applying domain name system (DNS) registration to a public cloud management organization, the domain name and the global IP address are registered in association with each other in a DNS server, which is an example of a conversion system for converting a domain name into a global IP address. This enables the client 13 to access the DNS server using the domain name, obtain the global IP address from the DNS server, and access the active system 11 using the obtained global IP address.

The DNS server notifies the global IP address together with information indicating a period of time (TTL), during which the global IP address is stored in a cache. Until the expiration of the notified TTL, the client 13 is able to access directly the active system 11 using the cached global IP address, without accessing the DNS server. Even in a case in which the service provision is taken over by the standby system 12 during the TTL, the client 13 is still able to receive the service from the standby system 12 using the cached global IP address. This is because the global address is reassigned to the standby system 12.

As illustrated in FIG. 1, the client 13 accesses the redundancy configuration system with the domain name, and accesses the active system 11 using the global IP address obtained from the DNS server in a state of normal operation. When an abnormality occurs in the active system 11, the global IP address is reassigned to the standby system 12 as indicated by an arrow in FIG. 1. Accordingly, the client 13 accesses the standby system 12 to which the global IP address is reassigned.

In a case in which the redundancy configuration system returns to a normal state due to maintenance of the active system 11, for example, the standby system 12 may continue to provide the service. In alternative, the system that is to provide the service may be switched to the active system 11. More specifically, the global IP address that is currently assigned to the standby system 12 is reassigned again to the active system 11 to switch the system that is to provide the service to the active system 11.

Figure 2:
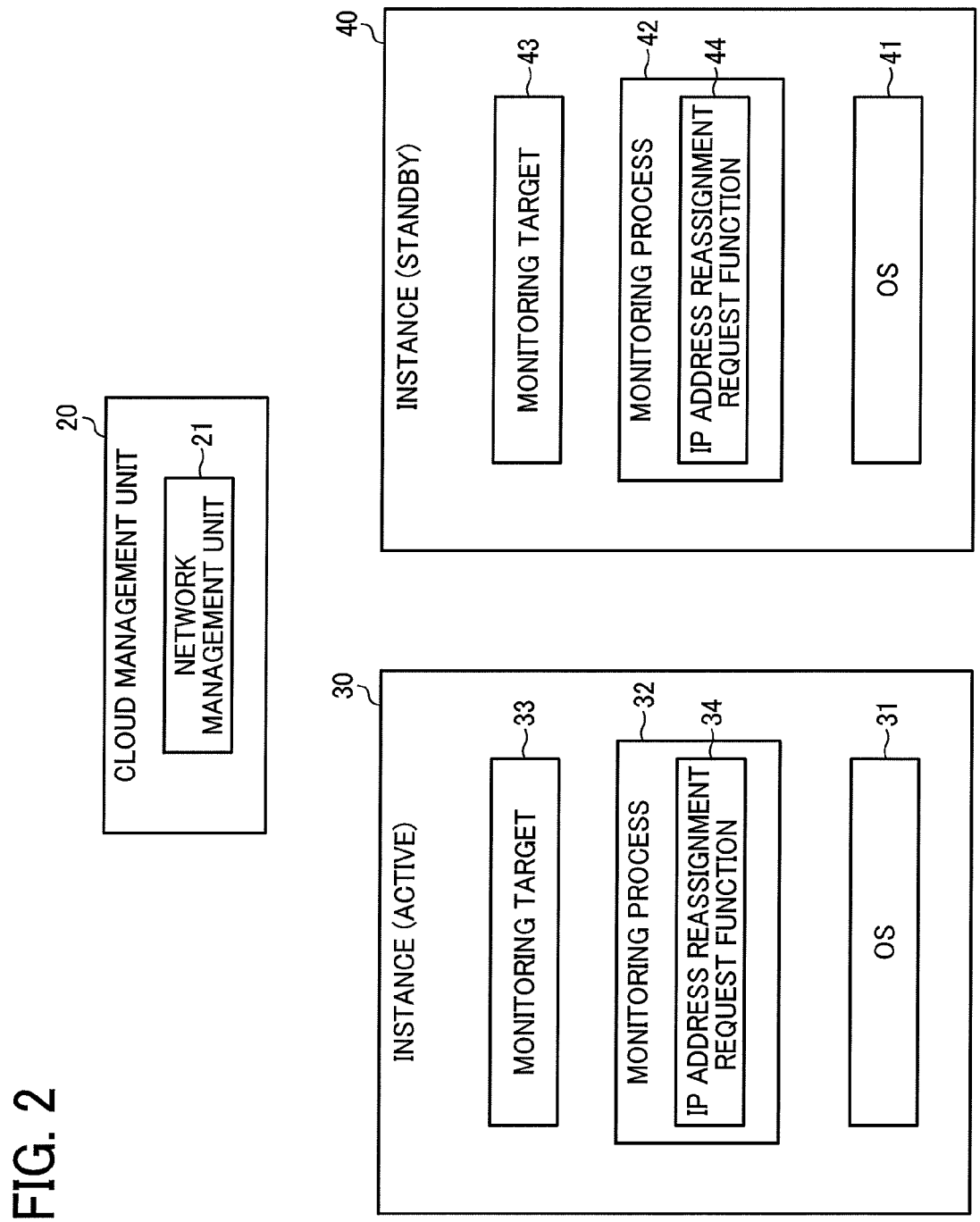
FIG. 2 is a block diagram illustrating an example of a system configuration of the redundancy configuration system according to an embodiment of the present disclosure.

Hereinafter, a description is given of a system configuration of the redundancy configuration system according to an embodiment of the present disclosure, with reference to FIG. 2. The redundancy configuration system is built on the public cloud 10. The public cloud 10 includes the management system for managing the public cloud 10. The management system includes a cloud management function 20. The cloud management function 20 includes a network management unit 21. The network management unit 21 manages a global IP address (hereinafter, simply referred to as an "IP address") to be associated with each of instances as the active system 11 and the standby system 12. Further, in response to receiving a request from one instance, the network management unit 21 reassigns an IP address that was assigned to another instance to the one instance from which the request is received. The instance is implemented by, for example, a program, which the active system 11 or the standby system 12 includes.

The redundancy configuration system includes an instance (active system) 30 and an instance (standby system) 40. The instance 30 is a program or the like, which the active system 11 includes. The instance 30 includes an operating system (OS) 31, a monitoring process 32 that operates on the OS 31, and a monitoring target (process or service) 33 to be monitored by the monitoring process 32.

The OS 31 implements basic functions commonly used by the monitoring process 32 and the monitoring target 33, and manages and controls the entire system. The monitoring process 32 monitors the monitoring target 33. In addition, the monitoring process 32 includes a function (IP address reassignment request function) 34 for requesting the reassignment of the IP address. The IP address reassignment request function 34 requests the network management unit 21 of the cloud management function 20 to reassign the IP address according to the monitoring result of the monitoring target 33. A process as the monitoring target 33 is implemented by a program according to which processing is executed using a memory allocated by the OS 31.

In the same or substantially the same manner as the instance 30, the instance 40 also includes an OS 41, a monitoring process 42 having an IP address reassignment request function 44, and a monitoring target 43. The instance 40 is a program or the like, which the standby system 12 includes. The instance 40 is used in place of the instance 30, when an abnormality occurs in the instance 30.

Figure 3:
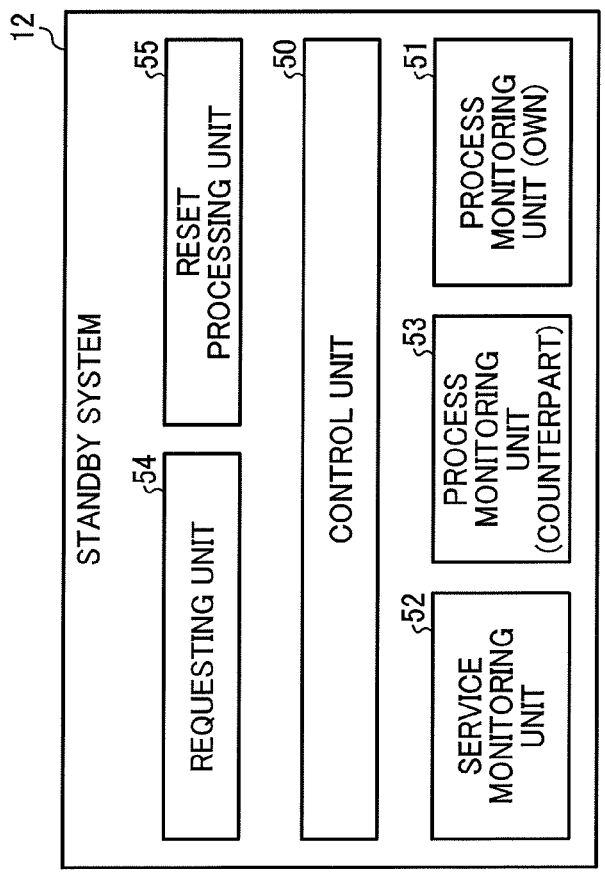
FIG. 3 is a block diagram illustrating an example of a functional configuration of any one of an active system and a standby system as a part of the redundancy configuration system according to an embodiment of the present disclosure.

Hereinafter, a description is given of a detailed functional configuration of the active system 11 and the standby system 12, with reference to FIG. 3. The active system 11 monitors the standby system 12, and the standby system monitors the active system 11. Both the active system 11 and the standby system 12 are able request the reassignment of IP address in accordance with the monitoring result and switch the instances mutually. Therefore, the standby system 12 and the active system 11 have the same or substantially the same functional configuration. For this reason, a description is given of the standby system 12, and redundant descriptions of the active system 11 are omitted below.

The standby system 12 includes a control unit 50, which is implemented by the OS 41. Further, the standby system 12 includes a process monitoring unit (own) 51, which is implemented by the monitoring process 42. The process monitoring unit (own) 51 monitors a process of the standby system 12 itself as the monitoring target 43. Further, the standby system 12 includes a service monitoring unit 52 and a process monitoring unit (counterpart) 53, each being implemented by the monitoring process 42. The service monitoring unit 52 monitors a service of the active system 11 as the monitoring target 43. The process monitoring unit (counterpart) 53 monitors a process of the active system 11.

The standby system 12 includes a requesting unit 54, which is implemented by the IP address reassignment request function 44 included in the monitoring process 42. The requesting unit 54 requests the network management unit 21 of the cloud management function 20 for the reassignment of IP address. Furthermore, the standby system 12 includes a reset processing unit 55. The reset processing unit 55 performs a process reset for returning the active system 11 and the standby system 12 to a normal state (initial state) in which the service is provided by the active system 11.

The process monitoring unit 53 and the service monitoring unit 52 monitor the process of the active system 11 and the service of the active system 11, and notify the requesting unit 54 of the monitoring result via the control unit 50. The process monitoring unit 51 monitors the operation status of process of the standby system 12. The process monitoring unit 51 notifies the requesting unit 54 of the monitoring result via the control unit 50.

Based on the monitoring results notified from the process monitoring unit 51, the service monitoring unit 52, and the process monitoring unit 53, the requesting unit 54 determines whether to reassign the IP address that is currently assigned to the active system 11 to the standby system 12. Based on the determination result that the IP address is to be reassigned to the standby system 12, the requesting unit 54 requests the network management unit 21 for the reassignment.

Since the active system 11 has the same functional configuration, the active system 11 requests the network management unit 21 for the reassignment of IP address when transitioning to a normal state. In response to the request, the network management unit 21 assigns the IP address again to the active system 11. Accordingly, the system is automatically switched. In alternative to such automatic switching, the system may be switched manually such as in accordance with a user's operation of pressing a reset key or button, for example. In response to this operation by the user, the reset processing unit 55 restarts the monitoring process 42. The restart is performed in both of the active system 11 and the standby system 12, and both systems return to the initial state. Accordingly, the IP address is assigned to the active system 11, and active system 11 operates as an active system, while the standby system 12 enters a standby state.

In this embodiment, the active system 11 also includes the service monitoring unit 52 and the process monitoring unit 53, in order to implement mutual monitoring. In another example, the active system 11 may not include the service monitoring unit 52 or the process monitoring unit 53, in a case in which the mutual switching is not to be performed and the active system 11 and the standby system 12 are to be returned to the initial state manually.

Figure 4:
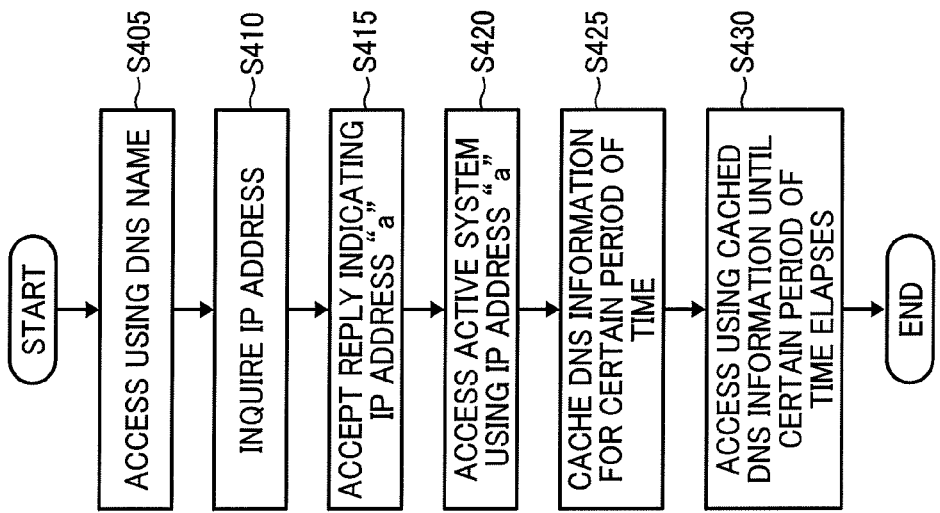
FIG. 4 is a flowchart illustrating an example of steps in an operation performed by a client according to an embodiment of the present disclosure.

Hereinafter, a description is given of steps in an operation performed by the client 13 with reference to FIG. 4. First, at S405, the client 13 accesses the redundancy configuration system using a domain name, for example, a DNS name "aaa.bbb.ccc.example.com". At S410, the client 13 inquires the DNS server set in the client 13 of an IP address associated with the above DNS name.

At S415, in response to receiving the above inquiry from the client 13, the DNS server searches for an IP address associated with the DNS name, and sends a response indicating an IP address "a", for example. At S420, the client 13 uses the IP address "a" to access the active system 11 to which "a" is assigned. Together with the notification of the IP address "a", the DNS server also notifies the client 13 of a period of time during which the IP address as DNS information is to be stored (cached). At S425, based on the DNS information, the client 13 caches, in its own storage area called a DNS cache, that "aaa.bbb.ccc.example.com" is "a" for the notified period of time.

At S430, the client 13 obtains the IP address from the DNS cache until the notified period of time has expired, and directly accesses the active system 11 using the obtained IP address. This means that no access to the DNS server by the client 13 occurs during the notified period of time. When the client 13 stops the access to the active system 11 upon receiving the service. Then, the operation of FIG. 4 ends.

Hereinafter, a description is given of steps in an operation performed by the redundancy configuration system in a normal operation, with reference to FIG. 5. First, at S505, the standby system 12 monitors the operation status of service as information processing at regular time intervals for the IP address "a" assigned to the active system 11. More specifically, the standby system 12 monitors whether or not a service request using the IP address between the client 13 and the active system 11 and the provision of the service in response to the request are performed normally.

In the active system 11 and the standby system 12, information for determining a priority order as to which system is to be used as an active system is stored. This information is changed based on the monitoring result. Therefore, the requesting unit 54 implements functions or processes of changing this information. Examples of this information include a priority level used for determining the priority order. Although any suitable information other than the priority level may be used, the following description is given of an example in which the priority level is used.

Since the active system 11 is used as an active system in a normal state, a high priority level is set to the active system 11. By contrast, since the standby system 12 is not used as an active system in a normal state, a priority level that is lower than the priority level set to the active system 11 is set to the standby system 12.

In this example, a result obtained by monitoring the operation status of the service of the active system 11 by the standby system 12 indicates that service is in normal operation. Based on the monitoring result, the standby system 12 maintains the currently set priority level unchanged from the current priority level or lowers the current priority level, so that a priority level that is lower than a current priority level of the active system 11 is to be set to the standby system 12 itself. In this example, the standby system 12 lowers the priority level. Thus, the priority level that is set to the standby system 12 is lower than the priority level that is set to the active system 11. Accordingly, a service is provided by the active system 11 that operates normally.

Although it is possible to identify which system is a communication counterpart by using an IP address, it is not possible to identify which application in the system is a destination of data or the like by using an IP address. It is possible to identify which application is the destination of data by using the port number of TCP port.

In view of this, at S510, the standby system 12 monitors whether the TCP port that is used for providing the service of the active system 11 is open. When the TCP port is open, the monitoring result is favorable. Based on this monitoring result, the standby system 12 maintains its own priority level, which is lower than the priority level set to the active system 11, unchanged, or lowers its own priority level. In this example, the standby system 12 lowers the priority level.

The monitoring whether the service is in normal operation or whether the TCP port is open is implemented by, for example by sending some packet to the IP address and the port number and checking whether a response is obtained within a certain period of time.

At S515, the standby system 12 monitors the operation status of its own process, in addition to monitoring of the active system 11 at S505 and S510. For example, the standby system 12 checks whether an appropriate program is operating so that the standby system 12 can immediately provide a service when the IP address is reassigned to the standby system 12. When an appropriate program has been activated and appropriate process is running, the monitoring result is favorable. Based on this monitoring result, the standby system 12 raises its own priority level.

At S520, the active system 11 monitors the operation status of its own process. In response to receiving a request for service provision from the client 13, the active system 11 determines whether the service is being appropriately provided. More specifically, the active system 11 checks whether an appropriate program has been activated and whether appropriate processes are running. When an appropriate program has been activated and appropriate processes are running, the monitoring result is favorable. Based on this monitoring result, the active system 11 raises its own priority level. More specifically, the active system 11 raises its own priority level to a level higher than the priority level that has been raised by the standby system 12.

At S525, the active system 11 and the standby system 12 respectively compare the priority levels which have been changed based on the monitoring results. Based on this comparison, a system having a priority level higher than that of the other system operates as an active system, and a global IP address is assigned to the active system. In this example, since the active system 11 has a higher priority level, the active system 11 is associated with the IP address, at S530. At S535, the active system 11 provides the service to the client 13. The requesting unit 54 implements functions or processes for comparing the priority levels and determining whether the IP address is to be reassigned. Upon completion of provision of the requested service, the operation of FIG. 5 ends.

The priority level of the standby system 12 used in the comparison at S525 has been lowered based on the service operation status of the active system 11, lowered based on the monitoring result indicating that the TCP port is open, and raised based on the operation status of its own processes. In this case, the priority level obtained by lowering a priority level of the time of normal operation twice and then raising the lowered priority level once may be used as a priority level as a comparison target. In another example, each priority level may be individually obtained and the total value of priority levels may be used as a priority level as a comparison target.

In a case in which the total value of priority levels is used as a comparison target, the active system 11 raises its own priority level to a higher value than the total value at S520 based on the monitoring result of the operation status of its own processes.

Hereinafter, a description is given of steps in an operation of switching the system when an abnormality occurs in the active system 11, with reference to FIG. 6. First, at S605, the standby system 12 monitors the operation status of the service for the IP address "a" at regular time intervals. When the monitoring result indicates that the service is not operating normally, the standby system 12 detects that an abnormality has occurred. In addition, the standby system 12 monitors whether or not the TCP port of the active system 11 is open. When the monitoring result indicates that the TCP port is not currently open, the standby system 12 detects that an abnormality has occurred.

At S610, the standby system 12 monitors the operation status of its own processes. In this example, since an abnormality occurs only in the active system 11, the monitoring result is favorable. Based on this monitoring result, the standby system 12 raises its own priority level, at S615.

At S620, when the active system 11 is in a state of being able to monitor the operation status of its own process, the active system monitors this operation status. When the monitoring result indicates that the service is not operating normally, the active system 11 detects that an abnormality has occurred. Accordingly, the active system 11 lowers its own priority level. In a case in which the abnormality has an influence on an OS or the like of the active system 11, the active system 11 is not able to monitor the operation status. In this case, the priority level of the active system 11 is maintained unchanged from a priority level of the time of normal operation.

At S625, the active system 11 and the standby system 12 respectively compare the priority levels that have been changed based on the monitoring results. In this case, the priority level of the standby system 12 is the same as that of active system 11, or higher than that of the active system 11. In this example, the priority level of the standby system 12 is higher than that of the active system 11. Accordingly, at S630, the standby system 12 requests the network management unit 21 to reassign the IP address that is currently assigned to the active system 11 to the standby system 12 itself. This request to the network management unit 21 is implemented by, for example, causing a program called a script for reassigning a specific IP address to the standby system 12 itself to operate.

At S635, the standby system 12 receives a notification indicating that the IP address that was assigned to the active system 11 has been reassigned to the standby system 12. In response to receiving this notification, at S640, the standby system 12 provides the client 13 with a service on behalf of the active system 11. Upon completion of provision of the requested service, the operation of FIG. 6 ends.

Figure 7:
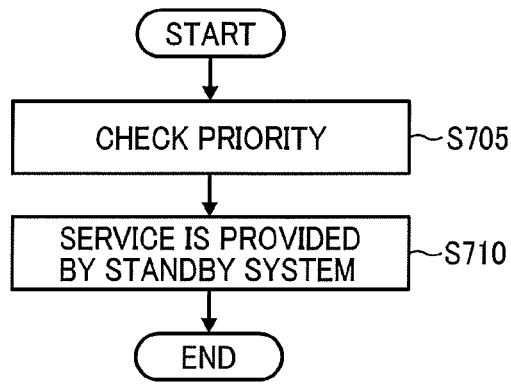
FIG. 7 is a flowchart illustrating an example of steps in an operation performed when the active system transitions from an abnormal state according to an embodiment of the present disclosure.

Hereinafter, a description is given of steps in an operation performed when the active system 11 transitions from an abnormal state, with reference to FIG. 7. At S705, the priority levels of the active system 11 and the standby system 12 are checked. At this time, the priority level of the standby system 12 is still the same as that of active system 11, or higher than that of the active system 11. Accordingly, at S710, the standby system 12 continues to provide the service until an abnormality occurs in the standby system 12. Then, the operation of FIG. 7 ends.

Figure 8:
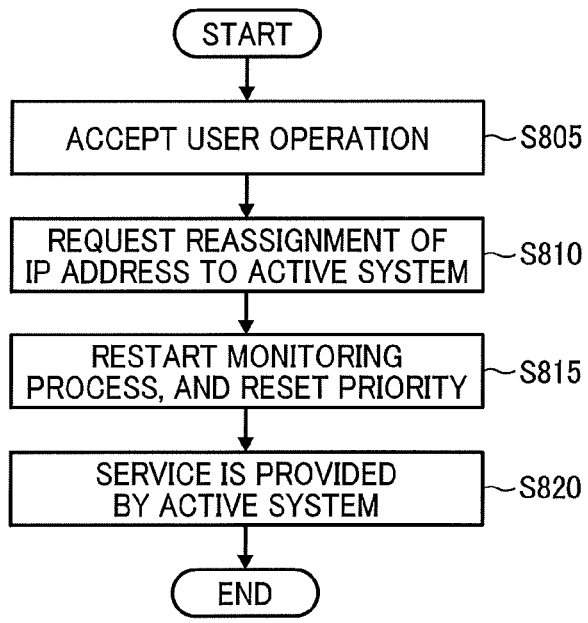
FIG. 8 is a flowchart illustrating an example of steps in an operation for switching from the standby system to the active system, according to an embodiment of the present disclosure.

Hereinafter, a description is given of steps in an operation for returning to a normal state in which the active system 11 provides the client with a service, with reference to FIG. 8. First, at S805, the active system 11 accepts the user's operation. At S810, the active system 11 requests the reassignment of the IP address that is currently assigned to the standby system 12 to the active system 11. More specifically, the active system 11 causes the script for reassigning the IP address to the active system 11 to operate. As a result, the IP address is reassigned to the active system 11.

However, at this time, the priority level of the standby system 12 is still the same as that of the active system 11, or higher than that of the active system 11. Accordingly, the IP address will be assigned again to the standby system 12, if the above comparison is performed.

In view of this, at S815, both the monitoring process 32 of the active system 11 and the monitoring process 42 of the standby system 12 are restarted, so that the changed priority levels are reset to those of normal operation. These restarting of monitoring process and resetting of priority level are performed by the reset processing unit 55 that each of the active system 11 and the standby system 12 includes. Through this process, the IP address is assigned again to the active system 11, and the priority level of the active system 11 becomes higher than that of the standby system 12. Accordingly, the normal state is restored in which the active system 11 provides the service. Thus, at S820, the active system 11 provides the service. Then, the operation of FIG. 8 ends.

In the above, a description is given of an example in which the IP address is manually changed according to a user operation such as pressing a key or button, for example. In another example, in the same manner as the processes performed when an abnormality occurs in the active system 11, the active system 11 may monitor the standby system 12 that is in operation to automatically change the IP address.

Figure 9:
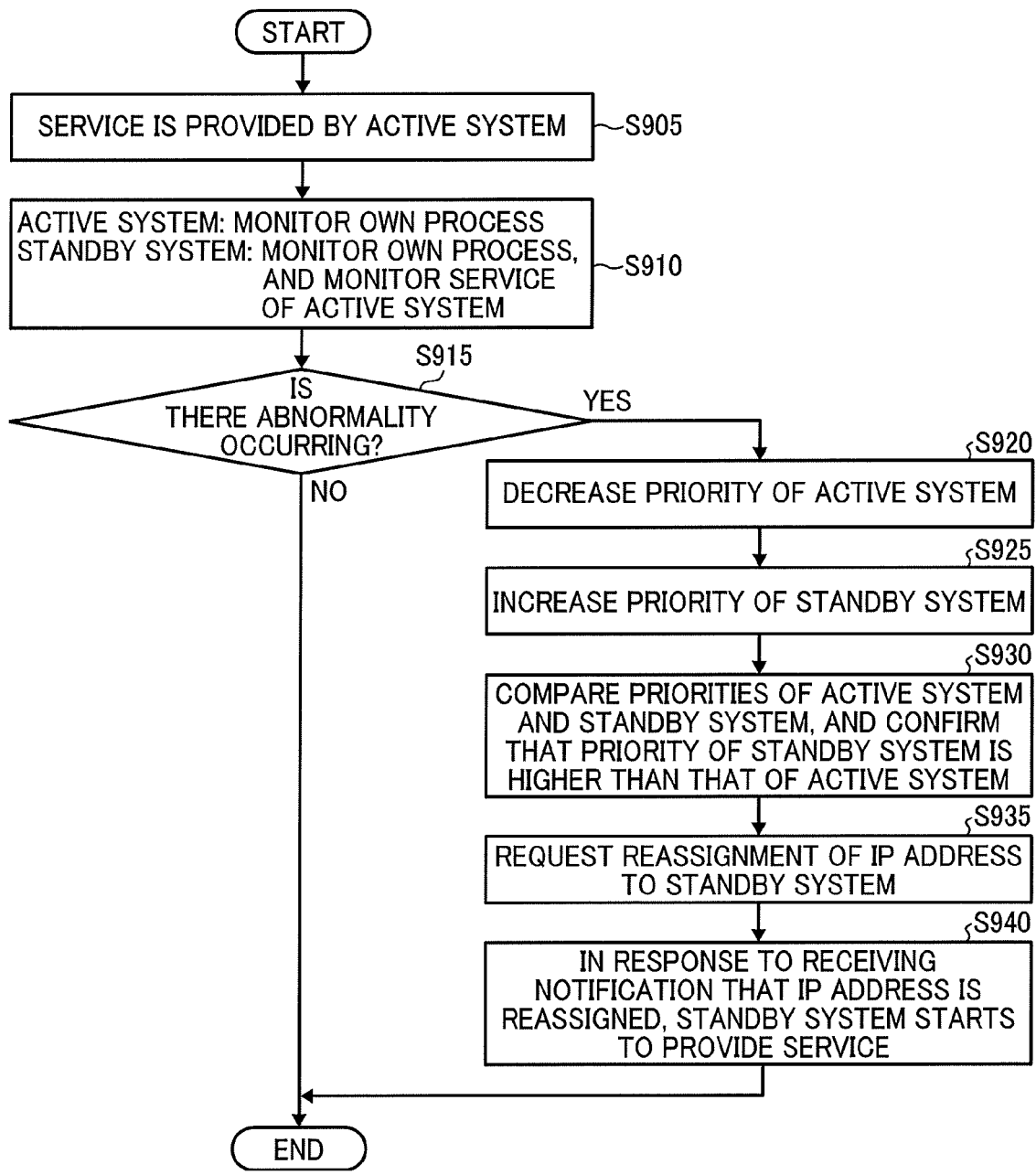
FIG. 9 is a flowchart illustrating an example of steps in an operation performed by the redundancy configuration system according to an embodiment of the present disclosure.

The operation of switching a system to another system performed by the redundancy configuration system described heretofore is summarized as illustrated in FIG. 9. At S905, in a normal operation, in response to receiving a service provision request from the client 13, the active system 11 provides the requested service to the client 13. At S910, the active system 11 monitors its own process, and the standby system 12 monitors its own process and the service of the active system 11.

At S915, it is determined whether any abnormality has occurred based on the monitoring results. In a case in which the monitoring results indicate that no abnormality has occurred, the operation of FIG. 9 ends. By contrast, in a case in which one or more abnormality has occurred, the operation proceeds to S920. At S920, the priority level of the active system 11 is lowered according to the monitoring result. More specifically, in a case in which any abnormality has occurred in a process operation status of the active system 11 and therefore the monitoring result is unfavorable, the priority level of the active system 11 is lowered.

At S925, the priority level of the standby system 12 is increased according to the monitoring result. More specifically, the priority level of the standby system 12 is increased, in a case in which an abnormality has occurred in the service operation status of the active system 11 and therefore the monitoring result is not favorable, in a case in which the TCP port is not open, and in a case in which no abnormality has occurred in the service operation status of the standby system 12 and therefore the monitoring result is favorable.

At S930, the priority level of the standby system 12 is compared with the priority level of the active system 11 to check whether the priority level of the standby system 12 is the same as that of the active system 11, or higher than that of the active system 11. In this example, the comparison result indicates that the priority level of the standby system 12 is higher than that of the active system 11. At S935, the standby system 12 requests the network management unit 21 to reassign the IP address that is currently assigned to the active system 11 to the standby system 12 itself.

At S940, the network management unit 21 reassigns the IP address that is currently assigned to the active system 11 to the standby system 12. In response to receiving, from the network management unit 21, the notification indicating that the IP address has been reassigned, the standby system 12 starts provision of the service. Then, the operation of FIG. 9 ends.

The reassignment of IP address is performed in a case in which a result obtained by comparing the priority level of the standby system 12 with that of the active system 11 indicates that the priority level of the standby system 12 is higher than that of the active system 11. In addition, the automatic restoration from the standby system 12 to the active system 11 is performed in a case in which a result obtained by comparing the priority level of the standby system 12 with that of the active system 11 indicates that the priority level of the active system 11 is higher than that of the standby system 12.

Figures 10, 11:
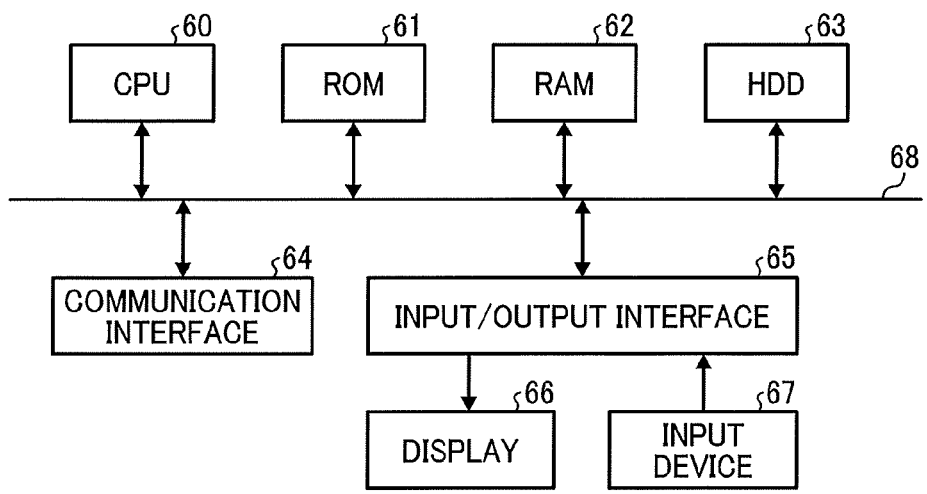
FIG. 10 is an example of a table of priority level data to be set to the active system and the standby system according to an embodiment of the present disclosure.
FIG. 11 is a block diagram illustrating an example of a hardware configuration of the active system according to an embodiment of the present disclosure.

This change of priority level is performed using a priority level data table. FIG. 10 is an example of the priority level data table. A description is given in detail of the priority level set for each of the active system 11 and the standby system 12, with reference to FIG. 10. It should be noted that each value in the table of FIG. 10 is an example of the priority value, and the priority level may be any other suitable value.

An initial value of the priority level of the active system 11 is set to "100", as indicated by "NORMAL STATE" in the table of FIG. 10. Further, the initial value of the priority level of the standby system 12 is set to "90", which is lower than initial value of the priority level of the active system 11. Each of the active system 11 and the standby system 12 monitors the operation status, service and process of the own system or the counterpart system. When the monitoring result indicates that an abnormality has occurred in either one or both of the systems, the systems changes their priority levels to values that are set in the table of FIG. 10 according to the monitoring target such as the service or port. In such monitoring of the operation status, multiple services and processes can monitored at the same time. In this case, the priority levels are changed to multiple values at the same time, and the total value thereof is used as the final priority value.

The standby system 12 monitors the operation status of the service with respect to the IP address of the active system 11. When the monitoring result indicates that an abnormality has occurred in that service, the standby system 12 increases the priority level of the standby system 12. For example, with reference to "GLOBAL IP ADDRESS SERVICE IS INOPERATIVE" in the table of FIG. 10, the priority level of the active system 11 is maintained unchanged from "100", which is the priority level for "NORMAL STATE". On the other hand, the standby system 12 increases its own priority level to "150" from "90", which is the priority level for "NORMAL STATE".

In substantially the same way, when the monitoring result indicates that the TCP port of the active system 11 is not open, the priority level of the active system 11 is maintained unchanged from "100", with reference to "PORT OF ACTIVE SYSTEM IS INOPERATIVE" in the table of FIG. 10. On the other hand, the priority level of the standby system 12 is increased from "90" to "110". In another example, the priority level of the standby system 12 is maintained unchanged from "90", and the priority level of the active system 11 is lowered from "100" to "80", which is lower than "90" as the priority level of the standby system 12. Settings are configured in advance as to which change is to be applied to the priority levels.

When an abnormality has occurred in the active system 11 and thereafter the active system 11 restores to a normal state, the priority level of the active system 11 is set to "90", and the priority level of the standby system 12 is set to "100", with reference to "SERVICE (PROCESS) OF ACTIVE SYSTEM IS RESTORED" in the table of FIG. 10. Accordingly, the standby system 12 continues to provide the service. When the monitoring process is restarted manually and thereby the priority levels are reset, the priority level of the active system 11 is changed to "100" and the priority level of the standby system 12 is changed to "90", which are priority levels for "NORMAL STATE".

When the operation for enabling the active system 11 to transition from the abnormal state is performed manually, the change of the priority levels is performed as described above. In another example, the operation for enabling the active system 11 to transition from the abnormal state is performed automatically. In this case, the priority level of the active system 11 is increased to 100, or maintained unchanged from 100, and the priority level of the standby system 12 is lowered to "70", with reference to "PROCESS OF STANDBY SYSTEM IS INOPERATIVE" in the table of FIG. 10. In other words, the priority level of the standby system 12 is set to be lower than the priority level of the active system 11.

When the monitoring process 32 of the active system 11 is stopped, the active system 11 becomes not able to monitor its own process. In this case, the priority level of only the standby system 12 is changed to "100", with reference to "MONITORING PROCESS OF ACTIVE SYSTEM IS STOPPED" in the table of FIG. 10. In substantially the same manner, when the monitoring process 32 of the standby system 12 is stopped, the standby system 12 becomes not able to monitor its own process, and the service and process of the active system 11. In this case, the priority level of only the active system 11 is changed to "100", with reference to "MONITORING PROCESS OF STANDBY SYSTEM IS STOPPED" in the table of FIG. 10.

When the "MONITORING PROCESS OF ACTIVE SYSTEM IS STOPPED" applies, the priority level of the standby system 12 is increased from "90", which is a value for "NORMAL STATE", to "100". In other words, the priority level of the standby system 12 becomes the same value as that of the active system 11 for "NORMAL STATE". In such case in which the priority values of the active system 11 and the standby system 12 are equal to each other, the IP address is reassigned to the standby system 12. Accordingly, the standby system 12 provides the service. On the other hand, when "MONITORING PROCESS OF STANDBY SYSTEM IS STOPPED" applies, the priority level of the standby system 12 is "90", which is a value for "NORMAL STATE". Accordingly, the priority level of the active system 11 is changed to "100" or is maintained unchanged from "100", which is higher than that priority level of the standby system 12. This enables the active system 11 to continue to provide the service.

Hereinafter, a description is given of a hardware configuration of any one of the active system 11 and the standby system 12 included in the redundancy configuration system. The active system 11 and the standby system 12 may have the same or substantially the same hardware configuration. Accordingly, a description is given of a hardware configuration of the active system 11, and redundant descriptions of the standby system 12 are omitted below.

FIG. 11 is a block diagram illustrating an example of hardware configuration of the active system 11. The active system 11 may have the same or substantially the same hardware configuration as a general-purpose personal computer (PC). For example, the active system 11 includes a central processing unit (CPU) 60, a read only memory (ROM) 61, a random access memory (RAM) 62, a hard disc drive (HDD) 63, a communication interface 64, an input/output interface 65, a display 66, an input device 67, and a bus 68.

The CPU 60 executes programs stored in the ROM 61 or the HDD 63 to control entire operation of the active system 11. The ROM 61 is a nonvolatile memory for storing a Basic Input/Output System (BIOS) to be executed when the active system 11 is started up or various setting values. The RAM 62 is a volatile memory that provides a work area for temporarily storing programs that are read by the CPU 60 for execution. The HDD 63 is a nonvolatile storage device that stores an operating system (OS), various programs, and various data. Although a description is given of an example in which the active system 11 includes the HDD 63, the HDD 63 is merely one example of a storage device. In another example, the active system 11 may include a solid state disc (SSD).

The communication interface 64 is a network interface for connecting the active system 11 to a network such as the Internet. The communication interface 64 enables the active system 11 to communicate with the client 13 etc., connected to the network. The input/output interface 65 is an interface for controlling the output of information to the display 66 and the input of information from the input device 67. Examples of the display 66 include a liquid crystal display (LCD) or an organic electroluminescence display (OELD). The display 66 displays information such as a content of notification transmitted from the client 13, etc. Examples of the input device 67 include a mouse or a keyboard. The input device 67 accepts information input by a user. The bus 68 connects the hardware components such as the CPU 60 or the ROM 61 as illustrated in FIG. 11, and transfers address signals, data signals, or various control signals.

It should be noted that each of the client 13 and the management system may have the same or substantially the same hardware configuration as that of the active system 11. Each of the active system 11 and the standby system 12 is implemented by, for example, a PC. In one example, each of the active system 11 and the standby system 12 is configured individually by a single PC. In another example, an HDD 63 of a single PC is divided logically into a plurality of partitions. In this example, the OS, the monitoring process, and the monitoring target are provided for each of the plurality of partitions, so that different ones of the plurality of partitions are used as the active system 11 and the standby system 12. In alternative to the above example in which each of the active system 11 and the standby system 12 is configured by a single PC or a single partition, each of the active system 11 and the standby system 12 may be configured by two or more PCs or two or more partitions.

The client 13 may have the same or substantially the same hardware configuration as that of the active system 11 as illustrated in FIG. 11. In another example, the client 13 may be implemented by, for example, a multifunction peripheral (MFP) having a plurality of functions such as a copier function, a printer function, a scanner function or a facsimile function, an electronic whiteboard, or a projector. Hereinafter, a description is given of a hardware configuration of an MFP as an example of the client 13, with reference FIG. 12.

Figure 12:
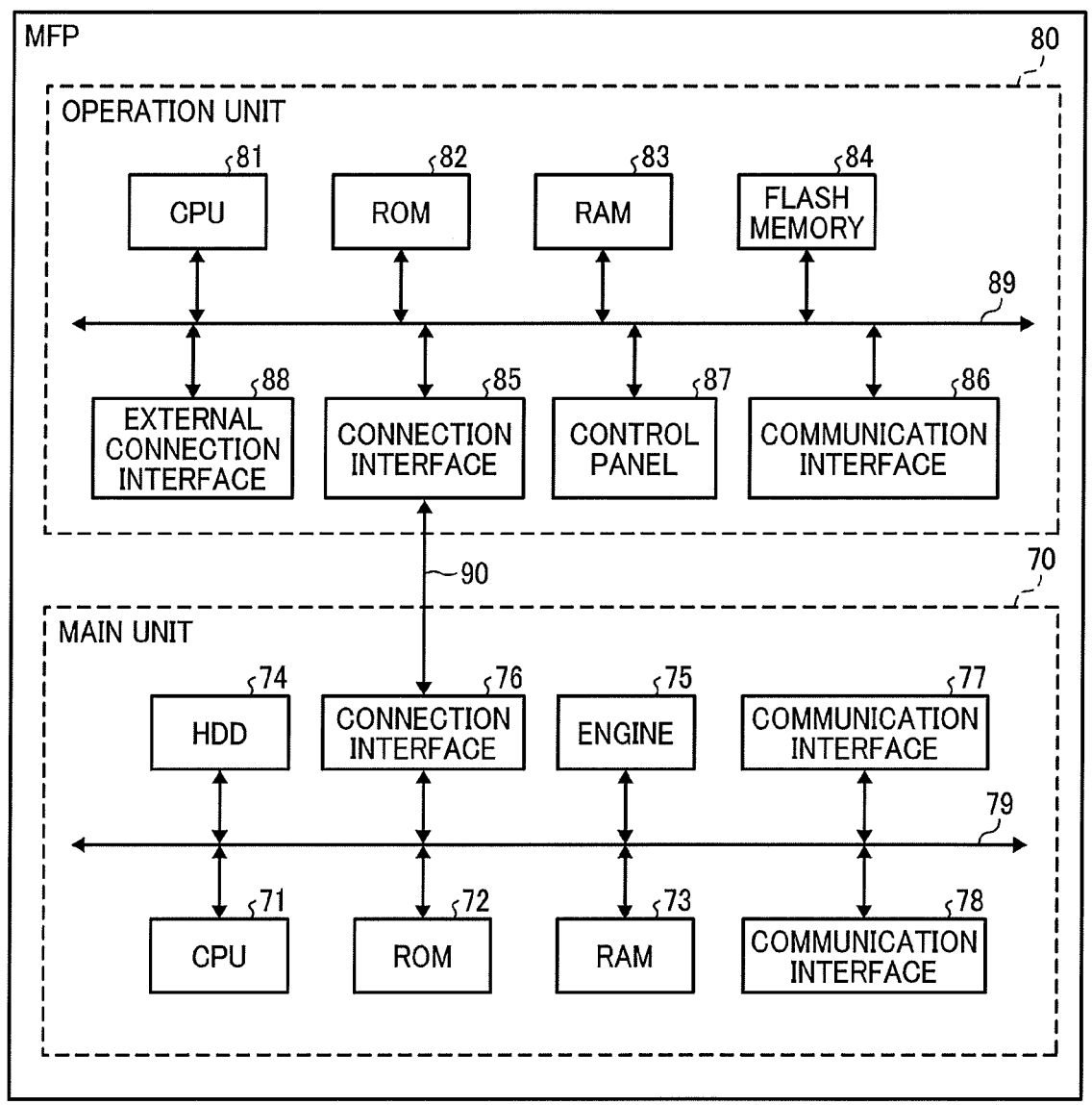
FIG. 12 is a block diagram illustrating an example of a hardware configuration of a multifunction peripheral (MFP) according to an embodiment of the present disclosure.

FIG. 12 is a block diagram illustrating a hardware configuration of the MFP. The MFP includes a main unit 70 and an operation unit 80. The main unit 70 implements various functions such as a copier function, a scanner function, a facsimile function, or a printer function. The operation unit 80 accepts an input according to a user's operation. The main unit 70 and the operation unit 80 are communicably connected with each other via a dedicated communication path 90. The communication path 90 may be in compliance with a universal serial bus (USB) standard. However, any arbitrary standard, regardless of wired or wireless, may be used as the communication path 90.

The main unit 70 operates in response to an input accepted by the operation unit 80. Further, the main unit 70 is able to communicate with an external apparatus such as a PC and perform an operation in response to an instruction received from the external apparatus.

The main unit 70 includes, as hardware, a CPU 71, a ROM 72, a RAM 73, an HDD 74, an engine 75, a connection interface 76, and communication interfaces 77 and 78, which are connected with one another via a bus 79.

The CPU 71 controls entire operation of the main unit 70. More specifically, the CPU 71 executes programs stored in the ROM 72 or the HDD 74 using the RAM 73 as a work area to control the entire operation of the main unit 70 and implement various functions such as the copier function, the scanner function, the facsimile function and the printer function as described above. In HDD 74, data such as documents or various setting information are stored, in addition to the above-described programs.

The engine 75 executes general-purpose information processing or processing other than communication for implementing various functions as described above. The engine 75 includes, for example, a scanner (image reading unit) that scans an image formed on a document, a plotter (image forming unit) that performs printing on a sheet such as a sheet of paper, and a facsimile unit that performs facsimile communication. The engine 75 may further include optional equipment such as a finisher that sorts the printed sheets, and an automatic document feeder (ADF) that automatically feeds documents to be scanned.

The connection interface 76 is an interface for enabling the main unit 70 to communicate with the operation unit 80 via the communication path 90. The communication interface 77 is an interface that enables the main unit 70 to transmit data such as a request for service provision to an external apparatus or system such as the redundancy configuration system via a network and receive a service from that external apparatus or system. The communication interface 78 is an interface that enables the main unit 70 to perform telephone communication or facsimile communication via a public network other than the network.

The operation unit 80 includes, as hardware, a CPU 81, a ROM 82, a RAM 83, a flash memory 84, a connection interface 85, a communication interface 86, a control panel 87, and an external connection interface 88, which are connected with one another via a bus 89.

The CPU 81 controls entire operation of the operation unit 80. More specifically, the CPU 81 executes programs stored in the ROM 82 or the flash memory 84 using the RAM 83 as a work area to control entire operation of the operation unit 80 and implement various functions. Examples of the functions implemented by the operation unit 80 include displaying information (for example, image) corresponding to an input accepted from a user, displaying information indicating an operation state, displaying information indicating a setting state, switching displayed contents, accepting information input, and accepting a selection.

The connection interface 85 is an interface for enabling the operation unit 80 to communicate with the main unit 70 via the communication path 90. The communication interface 86 is an interface that enables the operation unit 80 to exchange data via a network. The control panel 87 accepts an input or displays information as described above. In this example, the control panel 87 is implemented by, but not limited to, an LCD having a touch panel function. Alternatively, for example, the control panel 87 may be implemented by an OELD having a touch panel function. The operation unit 80 may include, in alternative to or in addition to the control panel 87, an operation unit such as hardware keys and/or a display unit such as an indicator lamp.

To the external connection interface 88, an external device such as an integral circuit (IC) card reader is connectable. The IC card reader connected to the external connection interface 88 implements a user authentication function of reading out information of a user who is to use the MFP stored in the IC card and authenticating the user. To the external connection interface 88, an external storage device such as an external HDD or other device may be connected.

According to an embodiment of the present disclosure, when an abnormality occurs in the active system 11, the IP address that is currently assigned to the active system 11 is reassigned to the standby system 12. This enables to construct a system even in a computing environment that does not support multicast communication. Further, this enables to construct a system without configuring any settings in that computing environment and continuously provide a service.

According to an embodiment of the present disclosure, even in a computing environment such as a public cloud, information processing is continued by switching one system in which an abnormality occurs to other system.

A description is given hereto for an example embodiment of a redundancy configuration system, an operation for switching one system to the other, an information processing system, and a program.

However, the above-described embodiment is illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Therefore, a computer-readable medium storing such program, an external device providing such program, and a management system can also be provided.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A redundancy configuration system that performs switching between a first information processing system and a second information processing system for continuously providing information processing, the redundancy configuration system comprising:
    circuitry to:
        monitor information processing performed by the first information processing system;
        based on a monitoring result obtained by the monitoring, change at least one of a score for the first information processing system and a score for the second information processing system, compare the score for the first information processing system with the score for the second information processing system to determine that address information is to be reassigned to the second information processing system based on a comparison result indicating that the score for the second information processing system is equal to or higher than the score for the first information processing system, and request a management system, which has assigned the address information to the first information processing system, to reassign the address information to the second information processing system; and
        control the second information processing system to start information processing in response to receiving a notification from the management system that the address information has been reassigned to the second information processing system.

2. The redundancy configuration system of claim 1, wherein the circuitry is further configured to perform processes of:
    increasing the score for the first information processing system based on the monitoring result indicating that no abnormality has occurred in an operation status of the first information processing system; and
    lowering the score for the first information processing system based on the monitoring result indicating that an abnormality has occurred in the operation status of the first information processing system.

3. The redundancy configuration system of claim 1, wherein
    the circuitry is further configured to monitor an operation status of the second information processing system and a status of communication between the first information processing system and a communication terminal that requests the first information processing system for the information processing, and
    the circuitry is further configured to perform processes of:
        increasing the score for the second information processing system, based on the monitoring result indicating that no abnormality has occurred in the operation status of the second information processing system;
        lowering the score for the second information processing system, based on at least one of the monitoring result indicating that an abnormality has occurred in the operation status of the second information processing system and the monitoring result indicating that no abnormality has occurred in the information processing of the first information processing system;
        at least one of increasing the score for the second information processing system, and lowering the score for the first information processing system, based on the monitoring result indicating that an abnormality has occurred in the information processing of the first information processing system;
        lowering the score for the second information processing system, based on the monitoring result indicating that no abnormality has occurred in the status of communication; and
        increasing the score for the second information processing system, based on the monitoring result indicating that an abnormality has occurred in the status of communication.

4. The redundancy configuration system of claim 3, wherein
    after the information processing by the second information processing system is started, the circuitry is further configured to change each of the score for the first information processing system and the score for the second information processing system to an initial value, in accordance with a user operation, the initial value of the score for the first information processing system being higher than the initial value of the score for the second information processing system.

5. The redundancy configuration system of claim 1, further comprising:
    two information processing systems, one of the two information processing systems operating as the first information processing system, and other one of the two information processing systems operating as the second information processing system, wherein, when information processing is started after the reassigning of the address information, the other one of two information processing systems operates as the first information processing system, and the one of the two information processing systems operates as the second information processing system.

6. The redundancy configuration system of claim 5, the two information processing systems perform one-to-one communication to mutually perform the monitoring on information processing performed by the two information processing systems.

7. The redundancy configuration system of claim 6, wherein
when the monitoring by the one of the two information processing systems that operates as the first information processing system stops operating, the requesting of reassigning the address information is performed so that the address information is reassigned to the other one of the two information processing systems that operates as the second information system.

8. The redundancy configuration system according to claim 1, wherein
a request of information processing for the redundancy configuration system is performed by using identification information identifying the redundancy configuration system, via a conversion system that converts the identification information into the address information.

9. The redundancy configuration system of claim 1, wherein the circuitry is further configured to monitor an operational status of the second information processing system in addition to monitoring the first information processing system, and change the score for the second information processing system based on the monitoring of the second information processing system.

10. A method for performing a switch between a first information processing system and a second information processing system for continuously providing information processing, the method comprising:
monitoring information processing performed by the first information processing system;
based on a monitoring result obtained by the monitoring, changing at least one of a score for the first information processing system and a score for the second information processing system, comparing the score for the first information processing system with the score for the second information processing system to determine that address information is to be reassigned to the second information processing system based on a comparison result indicating that the score for the second information processing system is equal to or higher than the score for the first information processing system, and requesting a management system, which has assigned the address information to the first information processing system, to reassign the address information to the second information processing system; and
controlling the second information processing system to start information processing in response to receiving a notification from the management system that the address information has been reassigned to the second information processing system.

11. The method of claim 10, wherein the changing step includes:
increasing the score for the first information processing system based on the monitoring result indicating that no abnormality has occurred in a operation status of the first information processing system; and
lowering the score for the first information processing system based on the monitoring result indicating that an abnormality has occurred in the operation status of the first information processing system.

12. The method of claim 10, wherein
the monitoring step includes monitoring an operation status of the second information processing system and a status of communication between the first information processing system and a communication terminal that requests the first information processing system for the information processing, and
the changing step includes
increasing the score for the second information processing system, based on the monitoring result indicating that no abnormality has occurred in the operation status of the second information processing system;
lowering the score for the second information processing system, based on at least one of the monitoring result indicating that an abnormality has occurred in the operation status of the second information processing system and the monitoring result indicating that no abnormality has occurred in the information processing of the first information processing system;
at least one of increasing the score for the second information processing system, and lowering the score for the first information processing system, based on the monitoring result indicating that an abnormality has occurred in the information processing of the first information processing system;
lowering the score for the second information processing system, based on the monitoring result indicating that no abnormality has occurred in the status of communication; and
increasing the score for the second information processing system, based on the monitoring result indicating that an abnormality has occurred in the status of communication.

13. The method of claim 12, wherein
the changing step includes, after the information processing by the second information processing system is started, changing each of the score for the first information processing system and the score for the second information processing system to an initial value, in accordance with a user operation, the initial value of the score for the first information processing system being higher than the initial value of the score for the second information processing system.

14. The method of claim 10, wherein
a redundancy configuration system that performs the method includes two information processing systems, one of the two information processing systems operating as the first information processing system, and other one of the two information processing systems operating as the second information processing system, and
when information processing is started after the reassigning of the address information, the other one of two information processing systems operates as the first information processing system, and the one of the two information processing systems operates as the second information processing system.

15. An information processing system that configures a part of a redundancy configuration system for continuously providing information processing, the information processing system comprising:

circuitry to:
monitor information processing performed by a counterpart information processing system;
based on a monitoring result obtained by the monitoring, change at least one of a score for the counterpart information processing system and a score for the information processing system, compare the score for the counterpart information processing system with the score for the information processing system to determine that address information is to be reassigned to the information processing system based on a comparison result indicating that the score for the information processing system is equal to or higher than the score for the counterpart information processing system, and request a management system, which has assigned the address information to the counterpart information processing system, to reassign the address information to the information processing system itself; and
start information processing in response to receiving a notification from the management system that the address information has been reassigned to the information processing system itself.

16. The information processing system of claim 15, wherein
the circuitry is further configured to perform processes of:
increasing the score for the counterpart information processing system based on the monitoring result indicating that no abnormality has occurred in a operation status of the counterpart information processing system; and
lowering the score for the counterpart information processing system based on the monitoring result indicating that an abnormality has occurred in the operation status of the counterpart information processing system.

17. The information processing system of claim 15, wherein
the circuitry further monitors an operation status of the information processing system itself and a status of communication between the counterpart information processing system and a communication terminal that requests the counterpart information processing system for the information processing, and
the circuitry is further configured to perform processes of:
increasing the score for the information processing system itself, based on the monitoring result indicating that no abnormality has occurred in the operation status of the information processing system itself;
lowering the score for the information processing system itself, based on at least one of the monitoring result indicating that an abnormality has occurred in the operation status of the information processing system itself and the monitoring result indicating that no abnormality has occurred in the information processing of the counterpart information processing system;
at least one of increasing the score for the information processing system itself, and lowering the score for the counterpart information processing system, based on the monitoring result indicating that an abnormality has occurred in the information processing of the counterpart information processing system;
lowering the score for the information processing system itself, based on the monitoring result indicating that no abnormality has occurred in the status of communication; and
increasing the score for the information processing system itself, based on the monitoring result indicating that an abnormality has occurred in the status of communication.

18. The information processing system of claim 17, wherein
after the information processing by the information processing system is started, the circuitry is further configured to change each of the score for the counterpart information processing system and the score for the information processing system itself to an initial value, in accordance with a user operation, the initial value of the score for the counterpart information processing system being higher than the initial value of the score for the information processing system itself.

* * * * *